June 6, 1961 E. B. LEAR ET AL 2,987,045
ANTI-FRICTION ROTATION MECHANISM FOR ROCK DRILLS
Filed May 12, 1958 5 Sheets-Sheet 1
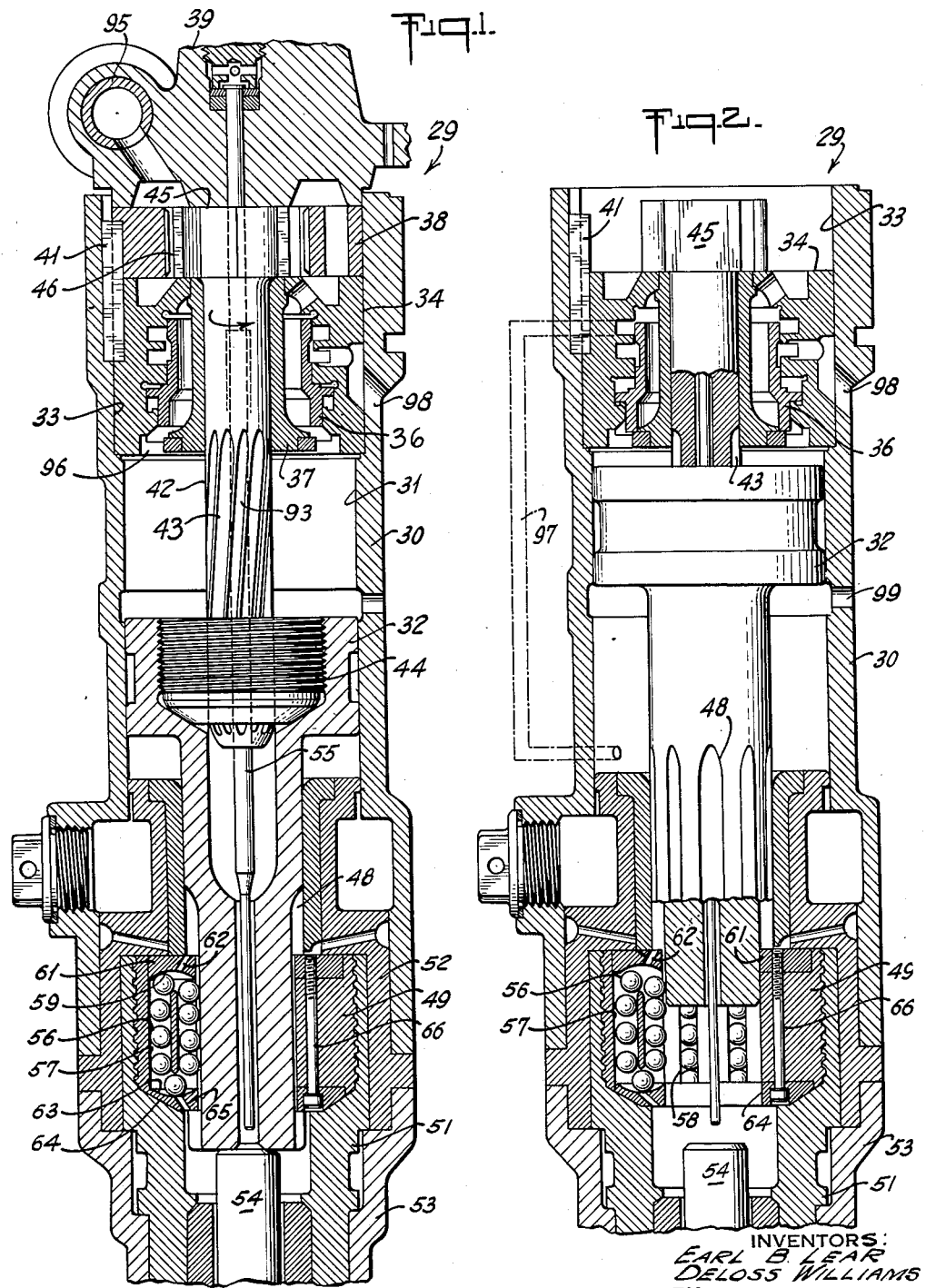
INVENTORS:
EARL B LEAR
DELOSS WILLIAMS
BY Raymond G. Mullee
ATTORNEY June 6, 1961 E. B. LEAR ET AL 2,987,045
ANTI-FRICTION ROTATION MECHANISM FOR ROCK DRILLS
Filed May 12, 1958 5 Sheets-Sheet 2

INVENTORS:
EARL B. LEAR
DELOSS WILLIAMS
BY
Raymond G. Mullee
ATTORNEY

INVENTORS:
EARL B. LEAR
DELOSS WILLIAMS
BY
Raymond G. Mullee
ATTORNEY

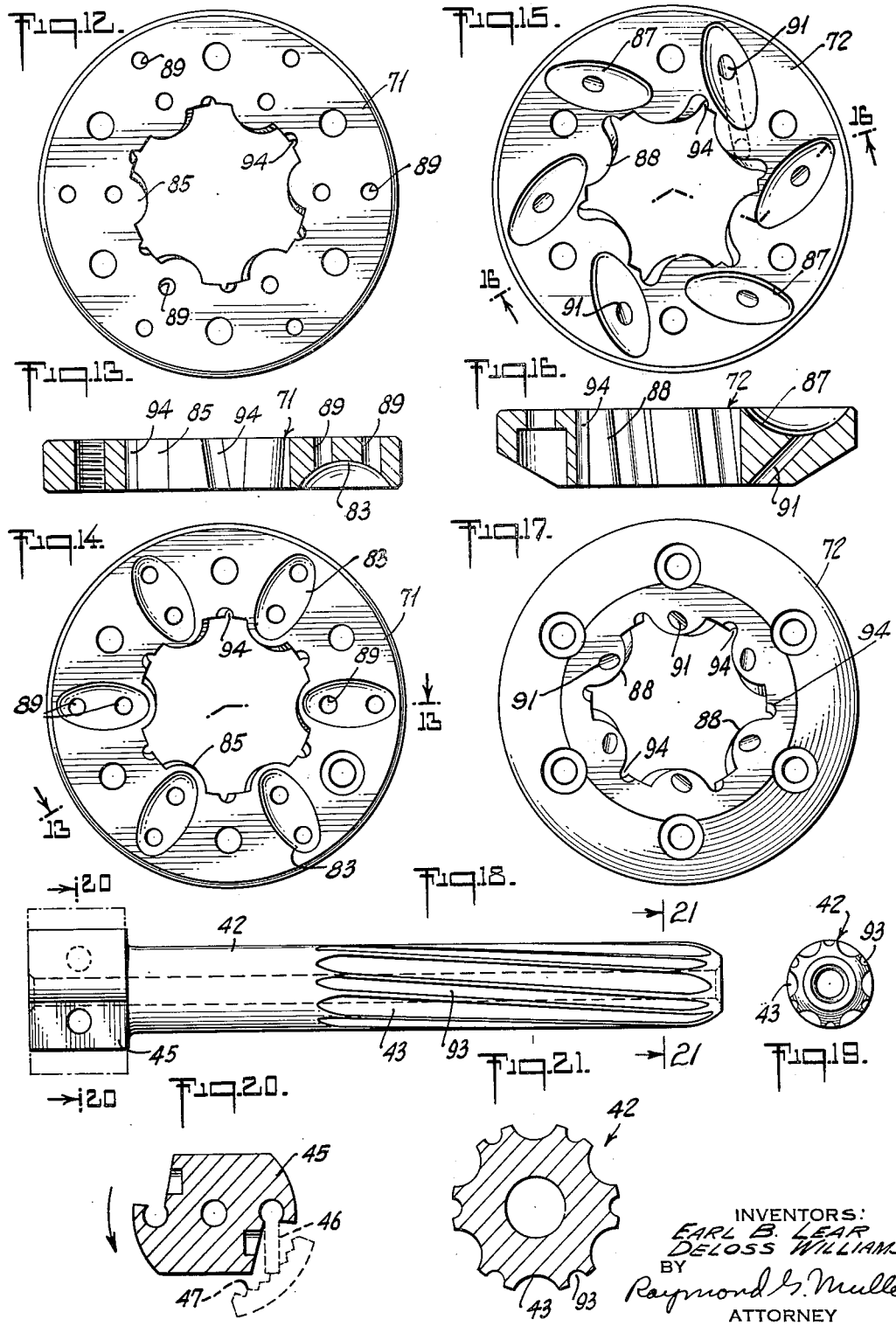

June 6, 1961 E. B. LEAR ET AL 2,987,045
ANTI-FRICTION ROTATION MECHANISM FOR ROCK DRILLS
Filed May 12, 1958 5 Sheets-Sheet 5

INVENTORS:
EARL B. LEAR
DELOSS WILLIAMS
BY
Raymond G. Mullee
ATTORNEY

United States Patent Office 2,987,045
Patented June 6, 1961

2,987,045
ANTI-FRICTION ROTATION MECHANISM FOR ROCK DRILLS
Earl B. Lear, Utica, and Deloss Williams, New York, N.Y., assignors to Chicago Pneumatic Tool Company, New York, N.Y., a corporation of New Jersey
Filed May 12, 1958, Ser. No. 734,620
15 Claims. (Cl. 121—6)

This invention relates to anti-friction mechanisms for converting reciprocating to unidirectional intermittent rotary movement, and has particular application to the rotation mechanism in a rock drill. This application is a continuation-in-part of parent application Serial No. 377,008, filed August 28, 1953, now abandoned entitled Rock Drill Rifle Bar Nut.

It is the usual practice to provide a rock drill with means for turning the working implement or drill steel, during the interval between impacts, to orient the radial cutting edges on the implement to strike the rock in a different angular position on the following power stroke. A common form of rotation mechanism, known as rifle bar rotation, comprises a rifle nut secured to the hammer piston of the rock drill, and a rifle bar extending co-axially with and projecting rearwardly beyond the piston, the rifle bar having helical flutes, or grooves frictionally engaging complementary splines in the rifle nut. The rear end of the rifle bar is provided with a head having a series of pawls which engage a stationary ratchet ring mounted in the back head of the rock drill. As the hammer piston reciprocates, and while the rifle bar is held against axial movement, the effect of the helical shape of the splines is to compel the rifle bar and piston to rotate relative to each other. Usually, the pawls are so arranged that the rifle bar turns in one direction during each power stroke of the piston, but is locked against turning during the up-stroke of the piston, thereby compelling the piston on its up-stroke to turn in the same direction that the rifle bar turned during the downstroke. In order to communicate a step by step rotary movement to the working implement, the hammer piston is provided with longitudinal splines on its forward portion which engage a chuck rotation nut mounted in a chuck sleeve. The latter engages a chuck sleeve or bushing which supports the end of the drill steel or reciprocal motion therein.

In prior devices, a considerable part of the power was lost because of the friction between the splines of the rifle bar and rifle nut, and also between the piston and chuck rotation nut. The friction had the effect of slowing down the drilling rate, increasing air consumption, creating excessive heat, and frictionally stalling the piston. Rifle bar friction has become a more serious problem lately, because of the practice of drilling holes of great depths, with sectional drill steels, which now require a much greater turning force than previously. With conventional arrangements, the increase in turning resistance, caused by the rock formation, is accompanied by an increasing rise in the force of friction between the helical splines as a result of which the piston frequently becomes stalled on its return stroke.

An object of this invention is to improve the efficiency of a rock drill by eliminating frictional losses in the rotation mechanism.

Another object is to enable the rock drill to deliver an adjustable force or blow, by throttling the air supply, without stalling the piston.

In one embodiment, the invention comprises the application of ball bearings maintained in a plurality of endless raceways formed in the rifle nut, each raceway having a helical portion complementing the helical groove of the rifle bar. Upon application of air pressure, the piston is moved axially relative to the rifle bar and the axial thrust is transmitted through the balls to the rifle nut in such manner as to convert the thrust into two components— one axial and the other rotative. The latter is transmitted through the rifle nut to the piston and chuck and then to the drill steel for causing step by step rotation of the latter.

In another embodiment of this invention, applied to front end rotation, the balls are interposed between spiral grooves at the front end of the piston and a ratchet ring surrounding the piston.

A further object of this invention is to obviate the danger of destruction to the balls due to overheating.

A still further object is to design the balls to be relatively large and the raceways to have sufficient length where needed, notwithstanding space limitations. Accordingly, a feature of this invention resides in the angular arrangement of the raceways.

Still another object is to provide means for cooling the ball bearings and associated raceway.

Another feature of the invention resides in the curvature of the raceways to permit the balls to circulate freely from one passage to another without any abrupt change in direction.

Another object is to simplify the construction and manufacturing cost of the rotation mechanism, and to prolong the life thereof. Pursuant to this object the balls are arranged to be confined within a body piece which is conveniently assembled with or disassembled from a pair of end plates. A feature of the invention resides in a set of lips on the end plates extending into the rifle bar grooves and providing additional room for raceway surfaces.

A further object is to provide improved means for supplying pressurized air past the rotation mechanism to the bore in the drill steel for hole cleaning purposes.

In the drawings where FIGS. 1-21 show one form of invention and FIGS. 22 and 23 illustrate a modification:

FIG. 1 is a longitudinal section of a rock drill in which the present invention is embodied, showing the hammer piston at the end of its forward stroke;

FIG. 2 is a sectional view similar to FIG. 1 with the back head omitted and with the piston at the end of its return stroke;

FIG. 12 is a plan view of the rear end plate of the ball bearing rifle nut assembly;

FIG. 13 is a longitudinal section of the rear end plate as seen from the irregular line 13—13 in FIG. 14;

FIG. 14 is a bottom view of the rear end plate;

FIG. 15 is a plan view of the front end plate used in the rifle nut assembly;

FIG. 16 is a longitudinal section of the front end plate as seen from the irregular line 16—16 in Fig. 15;

FIG. 17 is a bottom view in elevation of the front end plate;

FIG. 18 is an elevational view of the rifle bar on the same scale as FIG. 11;

FIG. 19 is a view of the front end of the rifle bar showing the helical splines thereon;

FIG. 20 is a cross-section through the head of the rifle bar as seen from line 20—20 in FIG. 18, and showing in dotted lines a fragmentary portion of the associated pawl and ratchet mechanism;

FIG. 21 is a cross-section as seen from line 21—21 in FIG. 18 but on the scale of FIG. 6;

Figure 5:
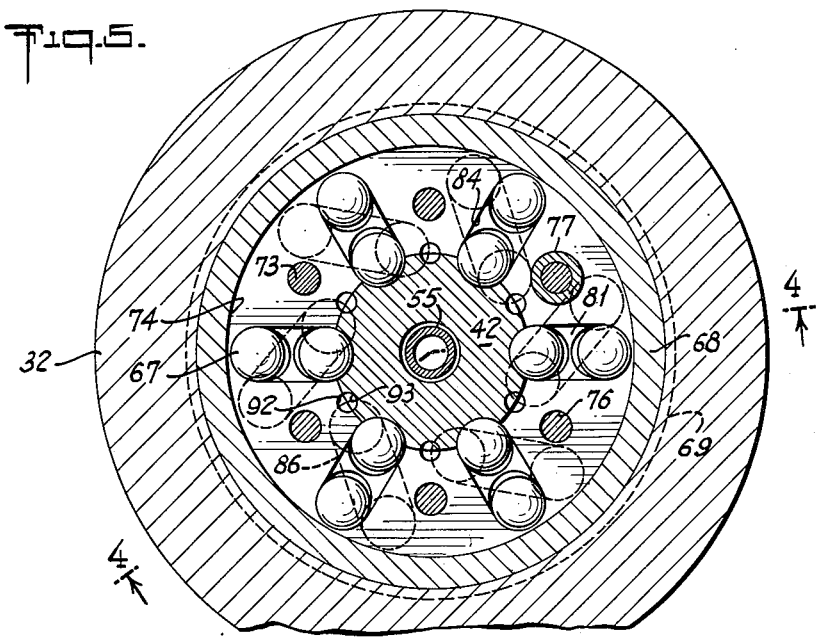
FIG. 5 is a cross-section as seen from the line 5—5 of FIG. 4, showing in full lines the radial raceways at the rear end of the rifle nut and in dotted lines the inclined transverse raceways at the front end of the rifle nut.

For convenience of description, the terms "upper" and "rear" (or "lower" and "forward") will be employed sometimes interchangeably, although it will be understood that the drill need not be held in a vertical position.

Referring to FIGS. 1 and 2, the rock drill 29 comprises a cylinder 30 having a piston chamber 31 in which a hammer piston 32 is arranged to reciprocate. The rearward end of the cylinder is counterbored at 33 to receive a valve case 34 which surrounds and supports for reciprocable movement an annular distributing valve 36. The valve case 34 further supports a sleeve 37, which is concentrically spaced with respect to the valve 36 to provide clearance as shown. Within the cylinder counterbore 33 and abutting the rear of the valve case 34, is a ratchet ring 38, while adjacent thereto is a back head 39, a portion thereof being shown in FIG. 1. A key 41 is arranged to lock the valve case 34 and ratchet ring 38 against angular movement within the cylinder counterbore 33. Rotatably supported within the sleeve 37 is a rifle bar 42 having spiral grooves 43 which engage a ball bearing rifle nut assembly 44 mounted in the head of the piston 32. The rifle bar has a head 45 pivotally supporting a plurality of pawls 46 (FIG. 20) which engage ratchet serrations 47 formed in the ratchet ring 38. With such an arrangement, the rifle bar has but one direction of rotation as indicated in FIGS. 1 and 20.

The forward end of the hammer piston 32 has a plurality of arcuate longitudinal grooves 48 which engage a chuck rotation nut 49 threadably mounted in a chuck sleeve 51. The latter is rotatably supported partially in a bushing 52 arranged in the forward part of the cylinder 30, and partially in a nose piece 53. A drill steel 54 is maintained for reciprocable movement within the chuck sleeve 51, and is further arranged to be rotated by the latter. Extending from the backhead 39 to a point just short of the drill steel end, is a water tube 55 which is used for supplying fluid to the drill hole during drilling operations so that the dust is wetted down.

In order to minimize friction between the reciprocating piston 32 and the chuck rotation nut 49, a ball bearing arrangement is provided. The arrangement includes a plurality of (for example 8) sets of ball bearings 56, each set being enclosed in an endless path of raceways located in a vertical plane. Each of the endless paths comprises an outer longitudinal bore 57 in the chuck rotation nut, an inner longitudinal passage closely spaced from the bore, said inner passage consisting of complementary raceways 58 and 48 formed in the nut and piston respectively, and a pair of radial raceways connecting the outer bore with the inner passage at the upper and lower ends thereof. The upper radial raceway 59 is formed along the bottom face of the rear end plate 61. In the radial plane of FIG. 1 the raceway 59 has a curvature which enables the balls to circulate from the outer longitudinal bore 57 to the inner longitudinal passage 58, 48 and vice versa without any abrupt change in direction. That is to say, the bottom of raceway 59 forms an arc substantially tangent to the outer edge of bore 57 and to the inner edge of raceway 58. In a section at right angles to said radial plane the raceway 59 is arcuate and has a radius slightly exceeding that of the balls 56. Each of the upper radial raceways 59 is connected to the upper end of the associated piston groove 48 by means of a port 62 extending through the plate 61, thus providing a passage for receiving exhaust air to cool the ball bearings 56. The lower radial raceway 63 is similar in shape and arrangement to the upper raceway 59 and is formed on the top face of the front end plate 64. The latter is provided with a set of ports 65 each connecting the raceway 63 with the lower end of the piston groove 48, or to the space below the piston to provide a passage for the cooling air admitted through the upper ports 62. The rear and front end plates 61 and 64 are firmly held in assembled relation with the body of the chuck rotation nut 49 by any suitable means such as a set of cap screws 66. The ball bearing arrangement just described permits the piston 32, with very little loss of power, to reciprocate rapidly relative to the chuck rotation nut 49 without any relative rotative movement. Accordingly, the step-by-step rotary movement of the piston (to be described presently) is transmitted through the chuck rotation nut 49 and chuck sleeve 51 to rotate the drill steel 54.

Figure 9:
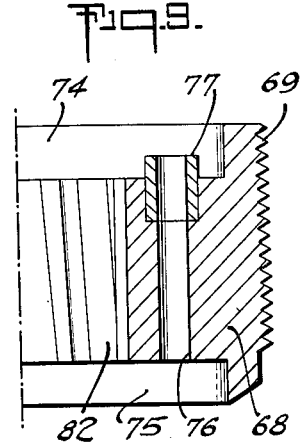
FIG. 9 is a fragmentary longitudinal section as seen from line 9—9 in Fig. 6.
Figure 7:
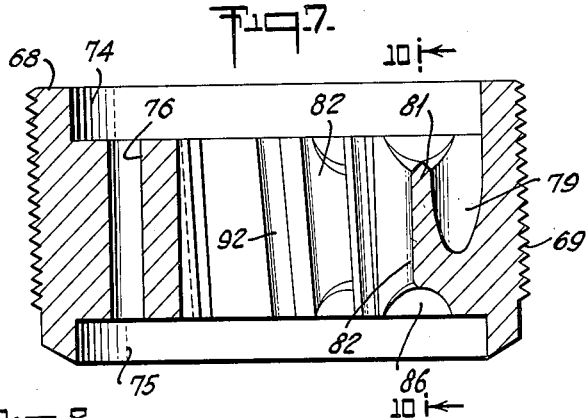
FIG. 7 is a longitudinal section as seen from the irregular line 7—7 in FIG. 6.
Figure 10:
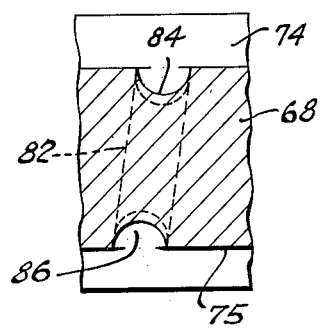
FIG. 10 is a fragmentary longitudinal section as seen from line 10—10 in FIG. 7.

The means for converting reciprocating movement of the piston 32 into step by step unidirectional rotary movement of the piston comprises the spiral grooves 43 in the rifle bar and a plurality of (for example six) sets of balls 67 (FIGS. 4 and 5) cooperating therewith and mounted in the ball bearing rifle nut assembly 44. The grooves 43 are arcuate in cross section and have a radius slightly larger than that of the balls to enable the latter to roll freely in the grooves. As shown best in FIG. 4, the nut assembly comprises a body piece 68 threaded on its periphery 69 for positioning within the head of the hammer piston 32, a rear end plate 71, a front end plate 72, the ball bearings 67 aforementioned, and a plurality of cap screws 73, for maintaining the nut in assembled condition. The body piece 68 is provided with counterbores 74 and 75 (FIG. 7) for receiving the rear and front end plates respectively, and is provided with holes 76 for receiving the screws 73. One of the screw holes 76 is counterbored to receive a dowel bushing 77 (FIG. 9) which extends into the rear end plate for alignment purposes. The body piece 68 has a central opening 78, the innermost part of which forms an interrupted cylindrical surface having a sliding fit with a complementary surface on the outermost periphery of the rifle bar 42.

Figure 11:
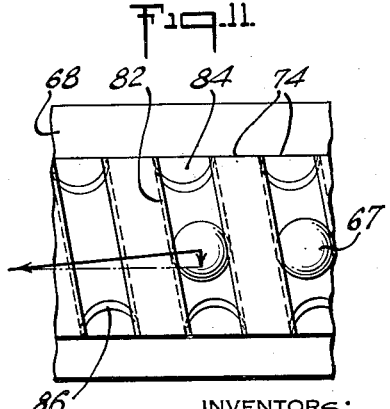
FIG. 11 is a development of the inside of the rifle nut body with only two balls assembled thereon.

Raceways for the ball bearings 67 are formed in part by six holes or outer ball raceways 79 which are slightly larger in diameter than the ball bearings. The holes 79 are spaced sixty degrees apart in the body piece 68 and each extends in a direction which is so inclined from a longitudinal plane as to increase the angle of skew between hole 79 and the adjacent rifle bar groove 43. In other words, the rifle bar grooves spiral with a right hand pitch while the spiral or helical direction of the holes 79 has a left hand pitch. Closely spaced from each longitudinal hole 79 and separated therefrom by a web 81, is an inner raceway 82. The inner raceway of each set forms an arcuate recess in the central opening 78. It extends spirally at the same pitch as the rifle bar grooves 43 and registers with the latter to form a cylindrical inner passage for the ball bearings, having the same diameter as the longitudinal holes 79 which form the outer passage. The inner raceway 82 has a cylindrical surface extending for more than 180 degrees to provide an inner opening somewhat less than the diameter of the ball 67 as shown in FIGS. 5 and 11. This prevents accidental separation of the balls from the rifle nut assembly when the latter is removed from the rifle bar.

Figure 4:
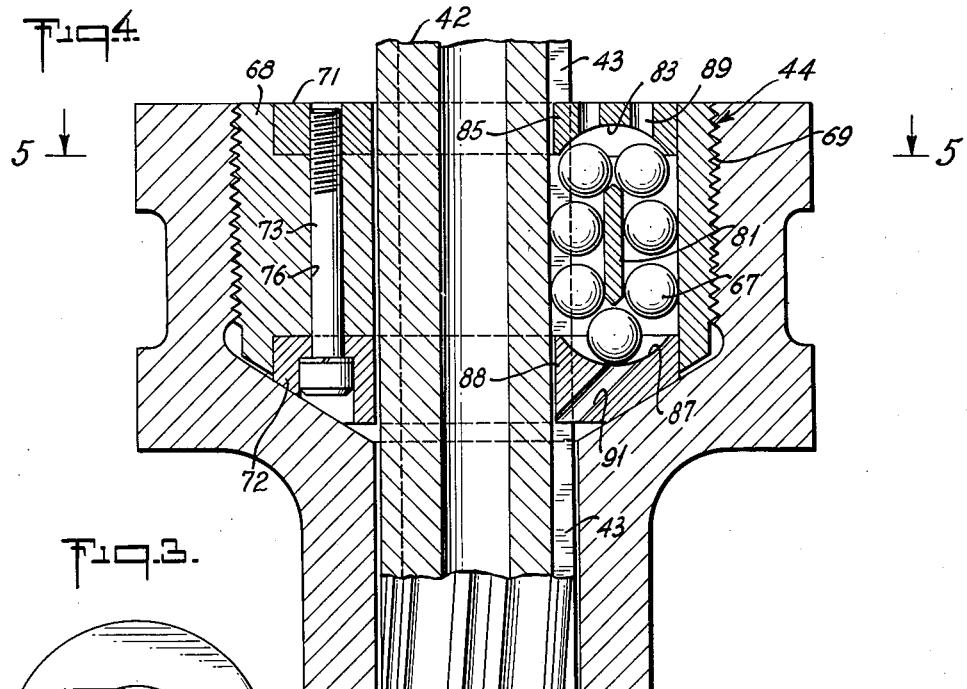
FIG. 4 is an enlarged longitudinal section through the hammer piston head and rifle nut as seen from the irregular line 4—4 in FIG. 5, showing a portion of the rifle bar and the ball bearing connection between the latter and the rifle nut.
Figure 3:
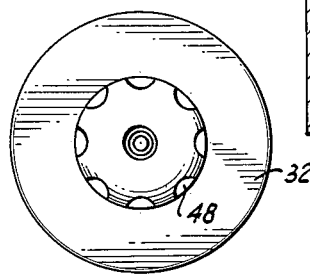
FIG. 3 is an elevational view of the front end of the hammer piston.
Figure 6:
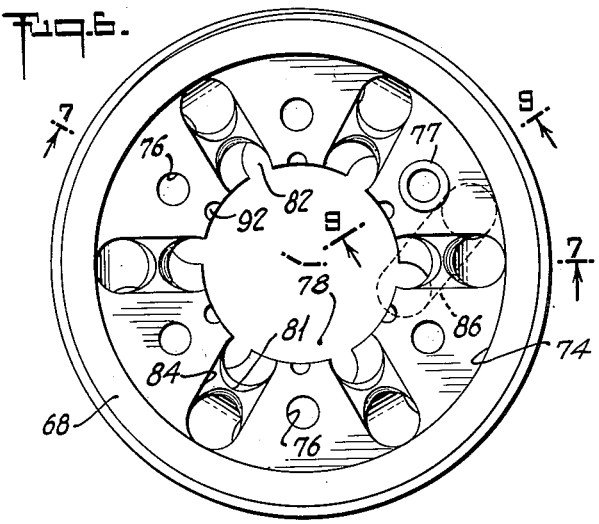
FIG. 6 is a plan view of the rear end of the rifle nut.

In order to permit the balls 67 to circulate from the outer passage (or raceway 79) to the inner passage (or pair of raceways 43, 82) and vice versa, a transverse raceway 83 (FIG. 13) is provided in the rear end plate 71, and a complementary transverse raceway 84 (FIG. 6) is provided in the upper counterbored face of the body piece 68, thus forming an upper transverse passage. Preferably this passage extends in a radial direction. As shown in FIGS. 4 and 13, the raceway 83 has a curvature in a vertical plane which enables the balls to circulate from the outer to the inner passage without any abrupt change in direction. In a section at right angles to said vertical plane the raceway 83 is arcuate and has a radius slightly greater than that of the ball 67. The raceway 84 is formed at the upper edge of the web 81. As seen in FIG. 6, raceway 84 is made very short, and the web 81 very thin, the purpose being to enable the balls 67 to be made as large as possible, consistent with the space limitations within the rifle nut assembly 44. To increase the length and bearing surface of raceway 83 without increasing the diameter of the rifle nut assembly, the rear end plate 71 is provided with tongues 85 (FIGS. 4 and 14) projecting into the rifle bar grooves 43.

Figure 8:
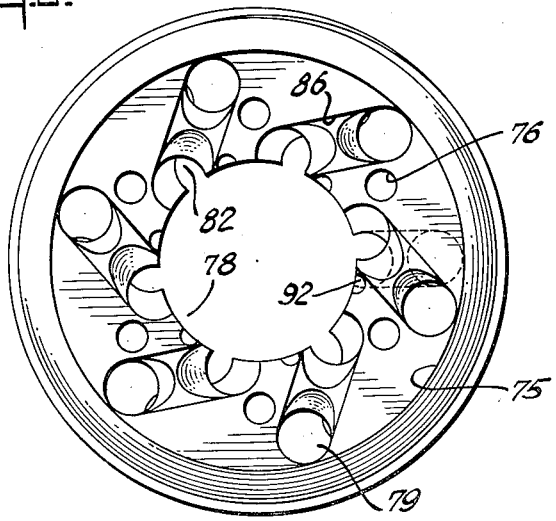
FIG. 8 is a bottom view of the front end of the rifle nut.

At their lower ends the outer passage 79 and inner passage 82, 43 are connected by an inclined raceway 86 (FIG. 8) in the lower counterbored face of body piece 68, and by an inclined raceway 87 (FIGS. 15, 16) in the upper face of the front end plate 72. The raceways 86 and 87 register with each other to provide a lower transverse passage. As in the case of the upper raceway 83, the lower raceway 87 is curved to permit the balls to circulate from the outer passage 79 to the inner passage 43, 82, and vice versa, without any abrupt change in direction. That is to say, the raceways 83 and 87 are formed to include arcuate portions substantially tangent to the outermost edge of hole 79 and to the bottom of the helical groove 43 in the rifle bar. The front end plate 72 is provided with tongues 88 (FIG. 15) projecting into the rifle bar grooves 43 as in the case of the upper set of tongues 85.

Each of the six sets of ball bearings 67 is arranged to circulate in a closed path traveling at great speed first in one direction, then in the reverse direction. The balls, which preferably are made of steel, are subject to stresses tending to overheat the balls and raceways, and unless precautions are taken, to crack the balls open with an explosive action. To minimize breakage, the balls are made as large as possible, consistent with the space limitations. If desired, the balls may be composed of tungsten carbide. This would obviate or reduce breakage but would add considerably to the cost, as there are forty-two balls in the illustrative embodiment. To diminish the heating effect, it is desirable to increase the length of the passages or raceways through which the balls circulate and especially the lower transverse passage 86, 87 where the balls are subjected to great stress. This is accomplished in the present invention by inclining the outer raceway 79 oppositely to the inner raceway 82 and by inclining the transverse raceway 86, 87 away from a radial line. Increase in the length of both upper and lower transverse passages is facilitated by the inwardly extending tongues 85 and 88. By thus lengthening the passages or raceways the invention provides a greater surface area for radiating or otherwise dissipating the heat.

The ball bearing rifle nut assembly of this invention may be provided with additional means for cooling the ball bearings by spraying them with a stream of cold air. For this purpose the rear end plate 71 is provided with a pair of drill holes or inlet ports 89 (FIGS. 4, 13 and 14) leading from the upper face of the plate to each of the radial raceways 83; and the front end plate 72 is provided with a drill hole or outlet passage 91 (FIGS. 4, 15 and 16) leading from each of the raceways 87 to the front end of the plate. Preferably, the outlet passage 91 is inclined forward and inward to discharge the stream of air into the spiral grooves 43 in the rifle bar.

Extending spirally between the inner raceways 82 in the body piece 68 is a set of semi-circular grooves 92 (FIGS. 5–8) for registry with semi-circular grooves 93 (FIGS. 1, 5, 18, 19 and 21) formed on the periphery of the rifle bar 42 intermediate the wide spiral grooves 43 thereof, to provide a series of passageways to allow for flow of air through the rifle nut assembly 44, for drill hole cleaning purposes. The rifle bar grooves 93 also register with complementary grooves 94 (FIGS. 12–17) formed in the rear and front end plates 71 and 72.

The operation of the rock drill shown in FIGS. 1–21 is as follows: "Live" air is admitted through the throttle valve 95, past the rifle bar head 45, and to the distributing valve 36 which distributes the air alternatively to the rear and front ends of the piston chamber 31, through the port 96 and passage 97 respectively, to reciprocate the piston in the usual manner. During the forward stroke of the piston the ball bearings 67 roll along the helical rifle bar grooves 43 moving forward along the rifle bar at a speed slightly more than half the instantaneous linear speed of the piston, but moving relative to the nut in a rearward direction through the inner nut raceways and relatively forward in the outer nut raceway 79. As the balls of each set circulate in an endless path, they move at high speed and since the balls have a substantial mass they deliver an impact to the end plates 71, 72 as each ball decelerates and reverses its direction. The impacts tend to cause heating of the balls and of the raceways. The impact force is reduced by the curvature of the transverse raceways 83 and 87 which avoids as far as possible any abrupt change in the direction of the balls. Also, the front raceway 87 is better protected against the deleterious effect of impact than is the upper transverse raceway 83 because it is longer and therefore has less concentration of stress and a greater area for dissipation of heat.

As the piston moves forward, the balls roll in the helical groove 43 to convert the axial thrust of the piston against the rifle bar into a rotary thrust tending to turn either the piston or the rifle bar or both. Rotation of the piston is resisted by the inertia of the piston and by its driving connection with the drill steel 54 through the spline groove 48, balls 56, chuck rotation nut 49, chuck sleeve 51 and chuck (not shown). On the other hand, the rifle bar 42 is released by the ratchet mechanism to rotate in a counterclockwise direction (looking forward) as indicated by the arrows in FIGS. 1 and 20 and rotates in that direction during the forward movement of the piston. When the piston reaches the end of its forward stroke it delivers an impact to the drill steel 24 and thus stops abruptly, causing the balls 67 in the outer nut raceways 79 to impact with increased force against the raceway 87 in the front end plate and suddenly come to rest.

During the forward movement of the piston 32 the air in front of the piston head is vented through passage 97, a set of ports under control of distributing valve 36, and the auxiliary exhaust port 98. Near the end of its forward stroke, the head of the piston 32 uncovers the main exhaust port 99 to cause a sudden drop in pressure in the rear end of the piston chamber 31 with the result that the distributing valve trips forward to the FIG. 2 position in a well-known manner thereby cutting off the supply of live air to the rear end of the piston chamber and instead directing live air through the passages 97 to the front end thereof. Live air thus admitted moves the piston rearward and after it expands it reduces its temperature below that of the atmosphere. Some of the air which is cooled by this thermo-dynamic action flows through the piston grooves 48 and ports 62 over the ball bearings 56 in the chuck rotation nut to cool the bearings, and then discharges through the port 65.

The return stroke of the piston is accompanied by relative axial movement between the piston and rifle bar opposite to that which occurred during the forward stroke.

However, the rifle bar is prevented from turning clockwise by the ratchet mechanism shown in FIG. 20. As the hammer piston 32 starts its return stroke, it first takes up the lost motion (in a rotary sense) between the piston and rifle bar which lost motion is due to the fact that the balls 67 have a radius slightly less than that of passages including the rifle bar grooves 43 and nut raceways 82. After the ratchet has engaged and the lost motion is taken up, the piston can move only in a spiral direction relative to the rifle nut, that is to say, the piston moves counterclockwise as it moves up. The turning movement of the piston meets with considerable resistance because of the inertia of the piston and the parts connecting it to the drill steel and also because of the friction between the drill steel and the drill hole (not shown). The result is that the balls 67, rolling rearward along the rifle bar groove 43 at one-half of speed of the piston, engage one side of the groove with considerable pressure. The reactive force of the piston transmitted through the balls to the rifle bar groove is resolved into two components, one in a rotary direction to turn the piston and the other in a forward direction tending to crowd the balls along the raceway 87 in the front end plate 72. The resolution of the reactive forces transmitted through the balls is illustrated in the force diagram in FIG. 11. Since the rotary component, or force resisting relative rotation between the piston and rifle bar, is much greater during the return stroke than during the forward stroke, the axial component is proportionately greater and therefore the contact pressure between the balls and the front end plate increases and tends to cause excessive heating of the balls and raceway 87.

The tendency to overheat is offset by the fact that the forward raceway 87 has a greater length and a greater area than the rear transverse raceway 83. It is also offset by the action of intermittent jets of air flowing from the rear end of the piston chamber 31 through the holes 89 in the rear end plate 71, over the balls 67 and associated raceway surfaces, and through the outlet ports 91 in the front end plate 72. Such air is periodically cooled by the thermodynamic action of the expanding air during the forward stroke of the piston. Near the end of its rearward stroke the piston, by compressing the air trapped in the rear end of the piston chamber 31, raises the pressure therein above that of the live air and trips the distributing valve back to the FIG. 1 position. The action of the piston in compressing trapped air momentarily causes a high pressure jet of air to blow over the ball bearings 67 through the holes 89 and 91 aforesaid.

The air which cools the rifle nut ball bearings 67 ultimately joins the air that cools the chuck rotation nut bearings 56 and the air passing along the rifle bar grooves 92, 93 and enters the usual bore in the drill steel 54 to discharge against the bottom of the hole (not shown) and remove the detritus therefrom.

The hammer piston 32 reciprocates at a very high rate, for example, 1900 cycles per minute, delivering an axial blow to the drill steel 54 at the end of each forward stroke. Between impacts, the piston delivers torsional forces to the chuck apparatus connected to the drill steel due to the action of the balls 67 in converting reciprocating to relative rotary motion. The torsional forces transmitted between the rifle bar 49 and the chuck sleeve 51 are of small magnitude during the free moving forward stroke of the piston, and are of large magnitude and in the opposite direction during the return stroke. Also at the instant of impact the rifle nut is subjected to torsional shocks due in part to the inertia of the balls. In order to prevent the torsional forces from unscrewing the rifle nut body 68 from the head of piston 32 the threads 69 are so directed with respect to the rifle bar grooves 43 (both having a right hand pitch) that the preponderant forces, occurring on the return stroke, tend to tighten the threaded connection 69 and drive the nut body 68 or front end plate 72 into tighter contact with the piston. If desired, the present invention could be arranged to rotate the piston on each forward stroke instead of on the back stroke, by the expedient of reversing the direction of the pawl and ratchet mechanism shown in FIG. 20. The disadvantage of forward stroke rotation is that it weakens the force of the blow against the drill steel.

The throttle valve 95 may be moved to a partly closed position to impede the flow of live air to the drill and thereby slow down the speed of the hammer piston and diminish the force of the blow. In conventional rock drills, employing rifle bar rotation the range of adjustability of the force of blow is limited because the air, when throttled to any great extent, fails to develop sufficient pressure to move the hammer piston against the frictional forces set up by the splined connection between the rifle bar and rifle nut with the result that the drill steel stalls. With the present invention, it is possible to turn the valve 95 to almost completely closed position and throttle the air down to the extent of producing very light taps on the drill steel without stalling the piston. The ball bearing rifle nut arrangement makes this possible.

Figure 22:
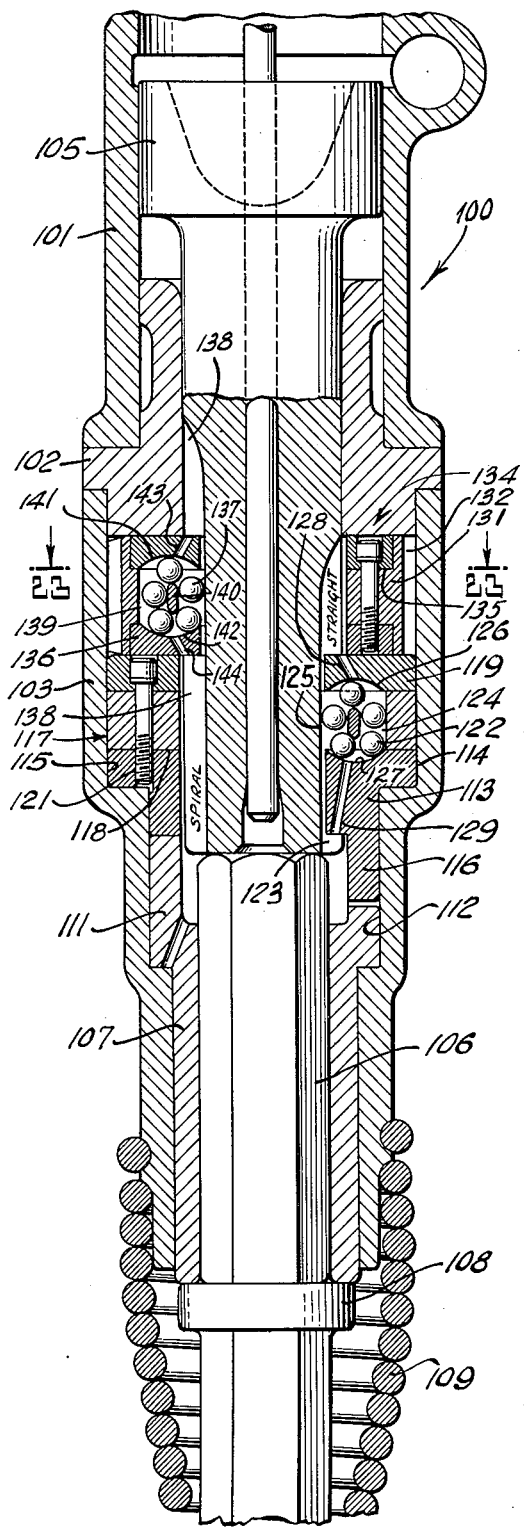
FIG. 22 is a longitudinal section of a modified rock drill provided with front end rotation including a ball bearing arrangement embodying the present invention.
Figure 23:
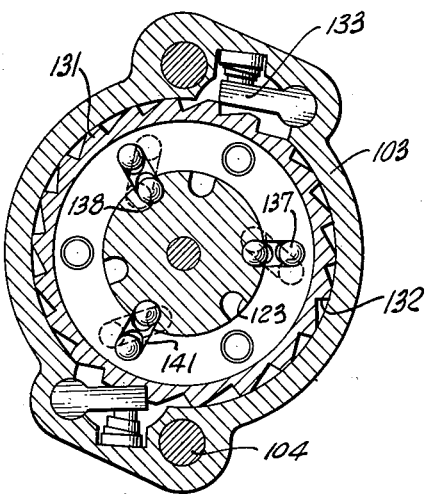
FIG. 23 is a cross-section as seen from line 23—23 in FIG. 22.

Referring now to FIGS. 22 and 23, the modified rock drill 100 is equipped with rotation mechanism at its front end. It comprises a cylinder 101, a cylinder bushing 102 and a front head 103 rigidly secured in assembled relation by the usual arrangement of through bolts 104. A hammer piston 105 is provided with a head mounted for reciprocation in the cylinder and with a forward extension supported in and extending beyond the cylinder bushing. The piston delivers impacts to a working implement or drill steel 106 mounted for relative reciprocation, but not relative rotary movement, in a chuck 107. The drill steel, as usual, is provided with a collar 108 abutting against the front end of the chuck to limit rearward movement toward the piston and engageable with a spring retainer 109 to prevent accidental separation from the drill. To enable it to rotate the drill steel, the chuck 107 is mounted for rotation in the front head, being supported for most of its length in the front head bore, and having an enlarged portion 111 fitting within an intermediate counterbore 112 in the front head. A chuck sleeve 113 is rotatably mounted in the front head 103 and has a forward portion fitting the intermediate counterbore 112 and an enlarged rear portion or head 114 fitting a rear counterbore 115 in the front head. The front portion has projections or keys 116 interlocked with complementary recessed portions of the chuck 107. The chuck sleeve head 114 forms the front end plate of a chuck rotation nut assembly 117 which includes also a body portion 118 and a rear end plate 119 secured by cap screws 121. The rotation nut assembly comprises three sets of ball bearings 122 arranged for rolling engagement respectively within three straight longitudinal grooves 123 in the piston 105. Each set of balls circulates in an endless path comprising an outer longitudinal bore 124, an inner longitudinal raceway 125 registering with piston groove 123, a rearward radial raceway 126, and a forward radial raceway 127, corresponding in shape, arrangement and function to the bore 57, inner raceway 58 and radial raceways 59 and 63 respectively in the chuck rotation nut assembly 49, 61, 64 of FIGS. 1 and 2. As a result of this arrangement the piston 105 is capable of reciprocating freely relative to the chuck elements rotated thereby, namely the chuck rotation nut assembly 117, chuck sleeve 113 and chuck 107, but is incapable of rotating relative to said elements, whereby the step-by-step rotary movement of the piston is transmitted to the drill steel 106.

The rear end plate 119 is provided with an aperture 128 and the front end plate or chuck sleeve 113 is provided with an aperture 129 for air cooling purposes as in the case of the holes 62 and 65 respectively of FIG. 1.

Confined in the rear counterbore 115 between the chuck rotation nut assembly 117 and the cylinder bushing 102 is a rotatable ratchet ring 131. As shown in FIG. 22, the ring is formed on its periphery with teeth 132 engaging a spring pressed pawl 133 pivoted to the front head 103 in such manner as to permit the ratchet ring to turn only in a counterclockwise direction, looking forward. Inwardly of its toothed periphery the ratchet ring forms the body portion of a spiral ball bearing nut assembly 134. The nut assembly comprises also a rear end plate 135 seated in a counterbore of the body member 131, a front end plate 136 seated in another counterbore in the body member, and three sets of ball bearings 137. The balls are arranged to roll respectively within three spiral grooves 138 in the piston. Each set of balls circulates in an endless path comprising an outer bore 139, an inner spiral raceway 140 registering with piston groove 138, a rear radial raceway 141 and a front transverse raceway 142 corresponding in shape, arrangement and function to outer bore 79, inner spiral raceway 82, upper radial raceway 83 and lower transverse raceway 87 respectively in the rifle nut assembly 44 of FIG. 4. As a result of this arrangement the piston 105 is constrained to rotate relatively to the nut assembly 134 as it reciprocates. The rear end plate 135 is provided with an aperture 143 extending from the rear portion of the piston groove 138 to the ball raceway 141 of each set; and the front end plate 136 is provided with a similar aperture 144 extending from the transverse raceway 142 to the front portion of the piston groove. The apertures provide means of passing air over the ball bearings 137 for cooling purposes.

In the operation of the rock drill shown in FIG. 22, the piston moves forward on its power stroke, passing freely through the chuck rotation nut assembly 117 which provides no resistance due to the action of the balls 122 rolling in the straight grooves 123. At the same time, the inclined grooves 138 of the piston roll along the ball bearings 137 in the spiral ball bearing nut assembly 134 thereby setting up a rotary component of force tending to turn the piston clockwise and/or the nut assembly counterclockwise. The nut assembly and its associated ratchet ring are relatively light in weight and are permitted to rotate counterclockwise by the pawls 133 as seen in FIG. 23. On the other hand, rotation of the piston is impeded by the large mass and inertia of the piston, chuck rotation nut assembly 117, chuck sleeve 113, chuck 107 and drill steel 106, and also by the frictional engagement between the drill steel and the bore hole (not shown). As a result, the ratchet ring 131 turns counterclockwise while the piston moves forward with little or no turning movement.

On the return stroke the spiral grooves 138 roll along the ball bearings 137 to set up a torsional force tending to turn the ratchet ring 131 clockwise and/or the piston counterclockwise. Since the ratchet ring is prevented from turning clockwise the piston turns counterclockwise, carrying with it the chuck rotation nut assembly 117, chuck sleeve 113, chuck 107 and drill steel 106.

The spiral ball bearing nut assembly 134 in the front end rotation mechanism of FIGS. 22 and 23 is subjected to torsional forces and shocks tending to overheat the balls 137 as in the case of the rifle nut assembly 44 of FIG. 4. However, the balls in the front end rotation mechanism are better protected than those in the rifle bar rotation mechanism because the raceways may be lengthened and the balls may be made larger as there is more available space. For example, the outer passages 139 for the balls 137 in FIG. 22 may be spaced from the axis of the piston by a distance approximating the radius of the piston head, whereas in FIG. 7 the passage 79 is necessarily confined to a region considerably removed from the periphery of the piston head.

What is claimed is:

1. A mechanical movement comprising a rifle bar, a reciprocating piston having an axial opening therein for receiving the rifle bar, a rifle nut rigidly mounted in a recess at the rear end of the piston, said rifle nut comprising a body portion and front and rear end plates, a plurality of sets of ball bearings interposed between the rifle bar and rifle nut in rolling engagement therewith, each set being arranged to circulate in an endless path which includes a spirally extending arcuate groove formed on the rifle bar and an inner raceway in the rifle nut registering with said spiral groove, said endless path also including an outer passage, a relatively thin web between the inner raceway and the outer passage and front and rear transverse passages, the outer passage comprising a cylindrical hole drilled through the nut body from the front face to the rear face thereof, the front and rear end plates having lips extending into the rifle bar grooves, the front and rear transverse passages comprising a curved groove formed in the front and rear end plates respectively, each curved groove extending along the inner face of one of the lips and into the rifle bar groove to provide increased length of the curved groove, the curvature of the end plate grooves being substantially in a tangential relation with the bottom of the rifle bar groove to permit free circulation of balls from the rifle bar groove to the transverse passages without abrupt change in direction, power means for reciprocating the piston to cause the balls to react alternately against the opposite sides of the spiral grooves in the rifle bar to convert relative axial into relative rotational movement between the piston and rifle bar, and ratchet means for locking the rifle bar against turning in one direction.

2. A mechanical movement according to claim 1, in which the rifle nut has a screw threaded connection in said recess at the rear end of the piston, and wherein the inner raceways of the rifle nut are slightly narrower at their longitudinal edges than the diameter of the balls therein whereby the balls are prevented from escaping from the rifle nut upon removing the rifle nut from the recess of the piston.

3. A mechanical movement according to claim 1, in which the balls are slightly smaller in radius than the curvature of the spirally extending arcuate groove.

4. A mechanical movement according to claim 1, in which the outer passages are spirally arranged in a direction opposite to the spiral grooves of the rifle bar and inner raceway, thus increasing the length of at least one of the transverse passages.

5. A mechanical movement according to claim 4, in which the rear transverse passage, including the curved groove in the rear end plate, extends radially, and the front end passage, including the curved groove in the front plate, extends at a substantial inclination to a radial plane whereby the front passage has a greater length than the rear passage.

6. A rock drill comprising a cylinder providing a piston chamber, a hammer piston reciprocating therein, a rifle bar projecting from the rear end of the cylinder and held against reciprocation, a rifle nut surrounding the rifle bar and rigidly mounted in a recess at the rear end of the piston, said rifle nut comprising a body portion and front and rear end plates, a plurality of sets of ball bearings interposed between the rifle bar and rifle nut in rolling engagement therewith, each set being arranged to circulate in an endless path which includes an arcuate groove extending spirally on the rifle bar and an inner raceway in the rifle nut registering with said spiral groove, said endless path also including an outer passage and front and rear transverse passages, the outer passage comprising a cylindrical hole extending through the nut body from the front face to the rear face thereof, the front plate having a lip extending into the rifle bar groove, the front transverse passage comprising an elongated raceway formed in the front end plate, the elongated raceway extending along the lip and into the rifle bar groove to provide increased length of raceway surfaces, the elongated raceway being curved at the lip portion in a substantially tangential relation to the bottom of the rifle bar groove to permit free circulation of balls from the rifle bar groove to the front transverse passage and vice versa without abrupt change in direction, fluid pressure means for reciprocating the piston to cause the balls to react alternately against the opposite sides of the grooves in the rifle bar to convert relative axial into relative rotational movement between the piston and rifle bar, a drill steel positioned to receive impacts delivered by the hammer piston and arrest the forward motion of the piston suddenly to cause the balls to impinge against the elongated raceway in the front end plate, said drill steel being drivingly connected to the piston, and ratchet means for locking the rifle bar against turning in one direction.

7. A rock drill according to claim 6, in which means is provided for cooling the ball bearings, comprising a pair of inlet apertures in the rear end plate having communication with the fluid pressure means, one communicating with the inner raceway and the other with the outer passage, and an exit aperture in the front end plate common to the inner raceway and the outer passage and inclined forwardly and inwardly to discharge air into the spiral grooves at the forward portion of the rifle bar.

8. In a rock drill, a cylinder, a hammer piston reciprocably maintained in said cylinder, a rifle bar positioned within the cylinder and having on its periphery a plurality of semi-circular grooves forming helical splines, said rifle bar being arranged for one direction of rotation in response to reciprocating movement of the piston, a ball bearing assembly disposed within the piston and having a plurality of sets of raceways each of which is formed with an outer enclosed portion and an inner open portion which is semi-circular in cross-section and coextensive with a portion of a grooved spline on the rifle bar, and a plurality of bearing balls in each set of raceways having close tolerances relative to the walls of the raceways, said ball bearing assembly also including a body piece, a front end plate and a rear end plate, the end plates each being fixedly maintained against an end of the body piece, the outer portion of each set of raceways being formed by a passageway drilled through the body piece, the inner portion of each set being formed on the inner surface of a bore hole made in the body piece, each end plate having a groove to interconnect each end of an enclosed portion and an open portion to form a continuous circuit for containing the plurality of balls aforesaid, the body piece having formed on the periphery of the bore hole between each open portion raceway a groove for alignment with a cooperating groove formed on the periphery of the rifle bar and between spiral grooves thereof, to provide a passageway for flow of cleaning fluid from the cylinder through the ball bearing assembly and forwardly through the hammer piston for drill hole cleaning purposes.

9. A rock drill according to claim 8, in which the body piece is threaded on the exterior periphery for threaded engagement with the hammer piston, and wherein the end plates are bolted in fixed relation to the body piece, whereby the body piece is removable from the piston as a unit together with the end plates and bearing balls, and the end plates are removable for replacement of the bearing balls and for cleaning of the raceways in the body piece.

10. A rock drill comprising a cylinder providing a piston chamber, a common piston reciprocating therein, a front head connected to said cylinder, a chuck sleeve rotatably mounted in the front head and arranged to impart rotary movement to a drill steel, a forward extension on the piston projecting into said chuck sleeve, a chuck rotation nut connected to drive the chuck sleeve and positioned in surrounding relation to the piston extension, a plurality of sets of ball bearings interposed between the piston extension and the nut, the balls of each set circulating in a separate endless path, said path including a separate straight longitudinal ball raceway on the piston extension registering with a complementary straight ball raceway on the inner surface of the nut, a second nut having a ratchet element externally thereof, the second nut being disposed rearwardly of the chuck rotation nut, said second nut having a plurality of sets of balls each set circulating in an endless path, the path last mentioned including a separate spiral raceway carried by the common piston intermediately of a pair of straight raceways on the piston extension and a complementary spiral raceway carried by the ratchet element, pawl mechanism for locking the ratchet element against rotation in one direction, the balls in said spiral raceways being arranged to engage against one side of the spiral raceway in the ratchet element to convert axial movement of the common piston to rotary movement in said one direction when the pawl mechanism is effective to lock the rachet element, and the chuck rotation nut serving to transmit such rotary movement to the chuck sleeve.

11. A rifle nut unit for associating a rifle bar having ball bearing raceways with a piston reciprocable coaxially relative to the rifle bar, comprising a thick cylindrical body including an axial bore adapted to slidably sleeve over the rifle bar, and having an externally threaded periphery whereby it is adapted to be threadedly engaged in the piston, endless spiral paths in the cylindrical body opening in part into the axial bore and opening out at opposite ends of the cylindrical body, bearing balls loosely filling the paths, and those in the part opening into the axial bore projecting partially into the bore and adapted to be received in the raceways of the rifle bar, the bearing balls being of a diameter greater than the opening of the part of the path opening into the bore whereby the balls are blocked against escape into the bore, a pair of end plates removably bolted over opposite ends of the cylindrical body, the end plates being formed on their inner face complementary to the portions of the paths at the upper and lower ends of the cylindrical body, the plates having inwardly extending lip portions overlying the portions of the balls projecting into the bore, the said lip portions being adapted to be entered into the spiral raceways of the rifle bar, and the end plates having apertures therethrough in communication with the upper and lower ends of the endless paths to allow for circulation of cooling air therethrough to the ball bearings.

12. A rifle nut having an axial bore for the reception of a rifle bar having ball raceways, a series of endless ball raceways in the nut, balls loosely filling the endless raceways for circulation about the latter, and in part projecting from the raceways into the axial bore for reception into the raceways of a rifle bar admitted into the axial bore, wherein lip portions formed at opposite ends of the rifle nut extend radially into the axial bore for reception into the raceways of the rifle bar upon admission of the latter into the bore, the lip portions being in overhanging relation to the projecting balls and in continuation of opposed portions of the endless raceways, and means defined by holes in opposite ends of the rifle nut having communication with the endless raceways for circulation of cooling air through the latter and over the balls, the lip portions of the rifle nut serving to absorb heat from the balls during circulation of the latter, and at least one of the said holes communicating with the endless raceways adjacent each lip portion whereby heat developing in the lip portions is subject to being rapidly dissipated.

13. A rifle nut as defined in claim 12, wherein the balls in the endless raceways are relatively large in comparison with the radial thickness of the rifle nut, each ball having a diameter equal substantially to one-third of the said thickness, and the height of the rifle nut being substantially twice the radial thickness of the nut, the large balls being adapted when circulating to absorb a proportionately large quantity of heat without cracking.

14. A rifle nut as defined in claim 12, wherein the rifle nut has a cylindrical body, and a ratchet ring is formed about the periphery thereof adapted for cooperation with pawl mechanism.

15. The combination comprising a rifle bar having spiral raceways for the reception of ball bearing splines, a piston reciprocable coaxially relative to the rifle bar and having in a head end thereof an axial internally threaded recess, and a rifle nut unit associating the piston with rifle bar for ball bearing spline movement of the piston relative to the rifle bar; wherein the rifle nut comprises a cylindrical body portion threadedly engaged in the recess of the piston, a pair of annular end plates removably bolted over opposite ends of the cylindrical body, the body and end plates providing an axial bore through which the rifle bar is slidably received, and the end plates providing radial inwardly extending lip portions each projecting into one of the spiral raceways of the rifle bar, a plurality of closed endless spiral paths in the cylindrical body, ball bearing splines loosely filling the spiral paths and adapted to freely circulate therein, each endless path having an inner track opening out into the said axial bore, the opening being slightly less in dimension than the diameters of the ball splines whereby the latter project substantially into the bore and are prevented from escaping from the endless path, each inner track confronting one of the spiral raceways of the rifle bar and the projecting balls being received in the associated raceways, each endless path also including an outer track, a relatively thin web of the cylindrical body extending between the inner and outer tracks, and transverse track portions in the upper and lower ends of the rifle nut unit completing the circuit of the outer track with the inner track of each endless path, the transverse track portions being formed in part in the end plates and extending along the inner sides of the lip portions, and air passage means through both end plates in communication with the endless paths for supplying cooling air to the interior thereof.

References Cited in the file of this patent
UNITED STATES PATENTS

| | | |
|---|---|---|
| 576,199 | Kimball | Feb. 2, 1897 |
| 851,728 | Boyrer | Apr. 30, 1907 |
| 1,324,327 | Turner | Dec. 9, 1919 |
| 1,689,731 | Kohlen | Oct. 30, 1928 |
| 2,298,503 | Osgood | Oct. 13, 1942 |
| 2,643,640 | Lear | June 30, 1953 |
| 2,890,594 | Golanska | June 16, 1959 |
| 2,895,343 | Orner | July 21, 1959 |

FOREIGN PATENTS

| | | |
|---|---|---|
| 583,532 | Great Britain | Dec. 20, 1946 |
| 272,047 | Switzerland | Feb. 16, 1951 |